Patented May 22, 1945

UNITED STATES PATENT OFFICE

2,376,424

BIOLOGICAL PRODUCT AND PROCESS OF OBTAINING SAME

Norbert H. Fell, Detroit, Mich., assignor to Parke, Davis & Company, Detroit, Mich., a corporation of Michigan No Drawing. Original application December 23, 1940, Serial No. 371,456. Divided and this application January 26, 1942, Serial No. 428,320

5 Claims. (Cl. 260—141)

The invention relates to the preparation of certain intermediate chemical compounds which are capable of being converted into therapeutic products useful in preventing the allergic symptons to which many people are subject as the result of their sensitivity to specific sensitizing substances.

The intermediates of the invention are, in general, histamine derivatives containing the histamine structure and in which at least one of the hydrogen atoms of said derivatives is replaced by a member of the class, radicals and chemical groups capable of coupling with protein. The new products are of the type, H—A, where H represents the histamine structure or radical and A represents the substituting member, such as —N=C=O, —CO—CH$_2$—X, and organic radicals containing one of these or other protein coupling groups, such as —COOH, —COX and —N=N—X$_1$, X being a halogen and X$_1$ being the anion of an acid.

This application is a division of my copending application, Serial No. 371,456, filed December 23, 1940, in which I have described and claimed the final therapeutic products and the processes for obtaining the same. This application is also a continuation-in-part of my copending application, Serial No. 225,612, filed August 18, 1938, now Pat. No. 2,301,532. The invention is illustrated by the following examples.

*Example 1.—Preparation of a nitro benzamide intermediate*

Two moles of histamine base are dissolved in hot dry chloroform and a solution of one mole of p-nitro benzoyl chloride dissolved in ether is stirred in. A heavy precipitate forms immediately which has a waxy appearance. The supernatant liquid layer is removed from the precipitate and centrifuged to remove all insoluble material. The precipitate is dissolved in boiling water, filtered while hot from any material which fails to dissolve, and the filtrate cooled to give crystals of the imidazolyl ethyl p-nitro benzamide. The crystals can be washed with acetone and ether and then dried at 110° C. They melt at 204° C. The compound prepared by this example can be represented by the formula,

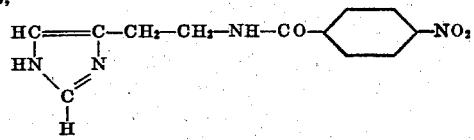

An analysis of the crystalline product gives the theoretical amount of nitrogen for a compound of this formula.

*Example 2.—Preparation of an amino benzamide compound*

One-half gram of imidazolyl ethyl p-nitro benzamide, prepared as in Example 1, is added to 50 cc. of a hot solution of 3.5 grams of ferrous sulfate (FeSO$_4$.7H$_2$O). 35 cc. of a 2.5% solution of ammonium hydroxide are then gradually added to the ferrous sulfate solution while heating on the steam bath. After adding all the ammonium hydroxide solution, the reaction mixture is heated for 30 minutes and the ferric hydroxide filtered off and the filtrate set aside to cool. The filtrate contains the imidazolyl ethyl p-amino benzamide. This compound may be obtained in solid form by allowing the filtrate to stand whereupon spontaneous crystallization sometimes occurs, or, evaporating off the solvent, or adding an organic solvent in which the amino benzamide is insoluble, thereby obtaining a precipitate or crystals which can be filtered off. The crystals have a melting point of 189–191° C. and differ from the corresponding p-nitro compound in being very soluble in acid and very insoluble in alkali. The product of this example is represented by the formula,

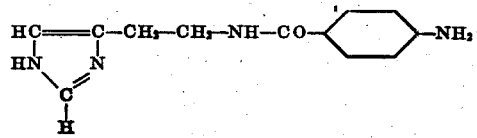

*Example 3.—Preparation of diazo compound of imidazolyl ethyl p-amino benzamide*

The filtrate from Example 2 containing the imidazolyl ethyl p-amino benzamide is neutralized with hydrochloric acid and 173 mgms. of sodium nitrite added while chilling the reaction mixture in an ice-salt mixture. The reaction mixture is acidified with 4.5 cc. of normal HCl and allowed to stand for about 20 minutes. It contains the diazotized imidazolyl ethyl p-amino benzamide.

Instead of using nitro benzoyl chloride, other nitro organic acid halides may be used to combine with the histamine to form an amide combination capable of reduction to give a free amino group for purposes of diazotization.

*Example 4.—Preparation of chloracetyl histamine*

The essential reactions of this example may be represented as follows;

(1) CH$_2$ClCOOH + SOCl$_2$ ⟶ CH$_2$ClCOCl + HCl + SO$_2$ (2) CH$_2$ClCOCl + HC══C—CH$_2$CH$_2$NH$_2$ ⟶

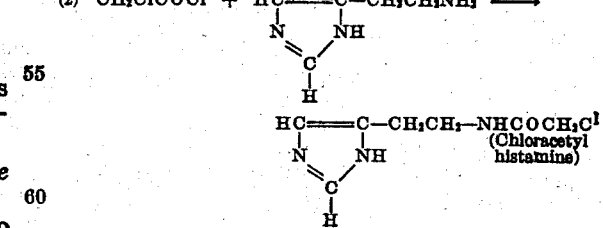

(1) 9.4 g. dry monochloracetic acid are placed in a 125 cc. Claisen flask fitted with a thermometer and a condenser leading to a flask connected to a Johnson water trap for absorbing HCl and SO₂. Thionyl chloride is added (11.0 g. or 7.06 cc.) drop by drop with shaking over a ½ hr. period. During the addition, the solution is heated on a water bath at 50–60°. When all is added, the temperature is raised to 90° and the gases and excess SOCl₂ are distilled off. The remaining liquid is cooled and filtered. It is chloracetyl chloride of boiling point 103° C.

(2) 500 mg. histamine are dissolved in 10 cc. hot chloroform and 1 cc. (1.5 g.) of chloracetyl chloride are added drop by drop. The solution becomes cloudy and a gummy precipitate forms.

It is allowed to stand ½ hr. and is then extracted with 10 cc. of water. The aqueous solution is evaporated to dryness and extracted with ether. The ether extract is dried in a desiccator until the gummy material becomes crystalline. The yield is 576 mg. of pure chloracetyl histamine analyzing approximately the theoretical percentage of nitrogen.

*Example 5.—Preparation of histamine isocyanate*

The chief reactions of this example may be represented as follows:

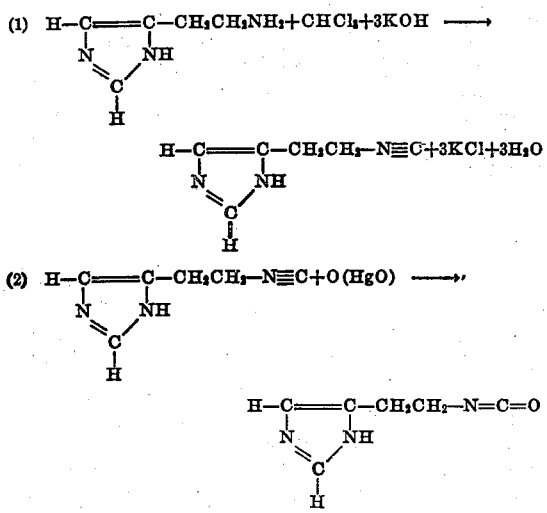

(1) 222 mg. histamine are dissolved in 5 cc. 95% ethyl alcohol and 1 cc. chloroform and 10 cc. alcoholic KOH are added. The solution is warmed ½ hr. at 50°. It is then evaporated on the steam bath until salts crystallize out. These are extracted with absolute alcohol and the extract evaporated nearly to dryness and chilled. A heavy oily material forms. This is dried to a solid substance over P₂O₅. Analysis shows almost the theoretical percentage of nitrogen for histamine isonitrile.

(2) The isonitrile is dissolved in 2 cc. H₂O and 160 mg. of oxide of mercury are added. The suspension is heated at 110° for 20 minutes on an oil bath. It is cooled, filtered and the filtrate evaporated to dryness. The dry solid product is histamine isocyanate.

*Example 6.—Preparation of histamine isocyanate with phosgene*

Histamine isocyanate referred to in Example 5 may also be prepared according to the following reaction.

The reaction for preparation of the histamine isocyanate is,

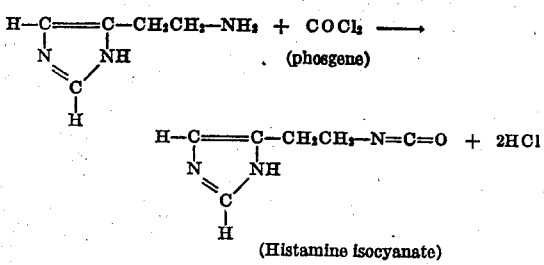

500 mg. of histamine are dissolved in 15 cc. of warm chloroform and 10 cc. of a 20% phosgene solution in toluene are added. The mixture is heated for ½ hour and the chloroform and toluene distilled off. The solution remaining is cooled, filtered and the precipitate of histamine isocyanate thereby obtained is dried.

*Example 7.—Preparation of 2(azo-benzidine-diazonium chloride)-histamine, i. e. 2-(4'-azo-xenlyene-4''-diazonium chloride)-histamine*

The essential transformations in this example may be illustrated as follows;

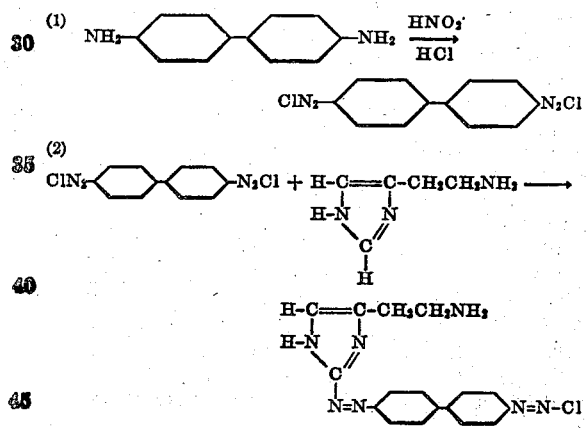

(1) 1 gram of benzidine is dissolved in 200 ml. of concentrated hydrochloric acid and the mixture chilled to 0°–5° C. Cold normal sodium nitrite solution is added to the chilled benzidine solution until starch iodide paper is turned a blue color by the mixture. A solution of diazobenzidine chloride is thus obtained.

(2) A quantity of 0.6 gram of histamine dissolved in 100 ml. of water is chilled and poured slowly into the diazobenzidine chloride solution and the reaction mixture allowed to stand for 15 minutes. 250 ml. of a cold solution of 3 grams of sodium acetate dissolved in 500 ml. of water and 20 ml. of normal potassium carbonate solution are then added and the solution allowed to stand for 15 minutes longer. The product in this step is the result of a coupling reaction with histamine. This can be proved by coupling the product of step 2 with α-naphthol and analyzing the α-naphthol coupled product for nitrogen. For example, 475 ml. of the cold solution containing the reaction product of histamine and azobenzidine diazonium chloride can be reacted with 0.65 gram of α-naphthol. The α-naphthol can be added while stirring in an ice bath and the reaction mixture allowed to stand ½ hour. The blue-black precipitate which form is filtered off, washed, dried and analyzed for nitrogen content. It analyzes 21.6% nitrogen, approximately the theoretical for 2-(azobenzidine azo-α-naphthol)-histamine of the formula, $C_{27}H_{23}ON_7$.

*Example 8.—Preparation of imidazolyl ethyl isocyano acetamide*

The chemical transformations of this example may be represented as follows:

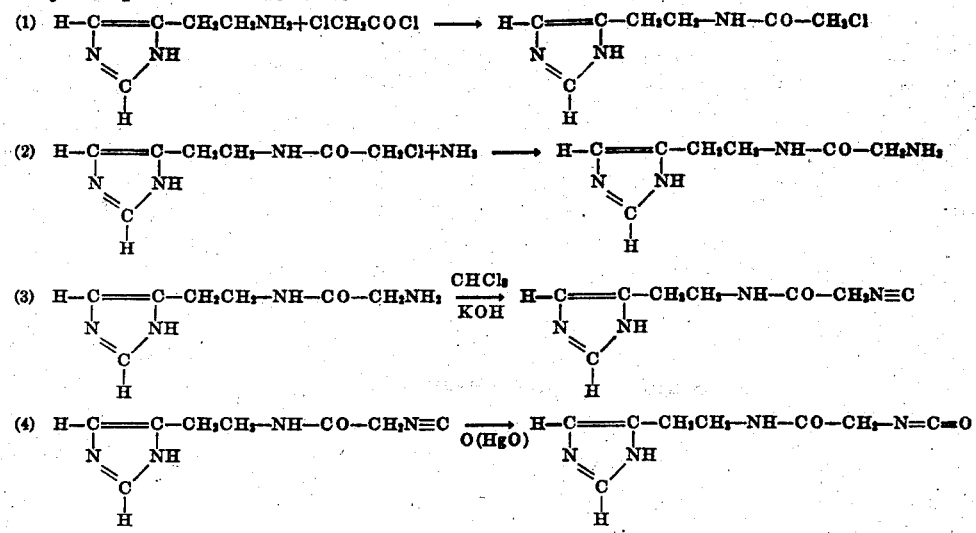

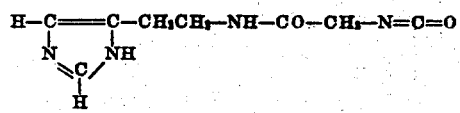

The chloracetyl histamine of the first step may be obtained as in Example 4.

The chloracetyl histamine is reacted with ammonia, for example in the form of an excess of concentrated aqueous ammonium hydroxide solution. The resulting amino acetamide derivative of histamine is extracted with a solvent, such as ether, and the solvent evaporated. The amino acetamide derivative is reacted with potassium hydroxide and chloroform and then with mercuric oxide in a manner analogous to that given for histamine in Example 5, or with phosgene in a manner analogous to that given under Example 6. The resulting product is imidazolyl ethyl iso- cyano-acetamide of formula,

*Example 9.—Preparation of p-[5-(β-methylaminoethyl)-1-imidazyl] benzene-diazonium chloride*

The chemical transformations of this example may be represented as follows:

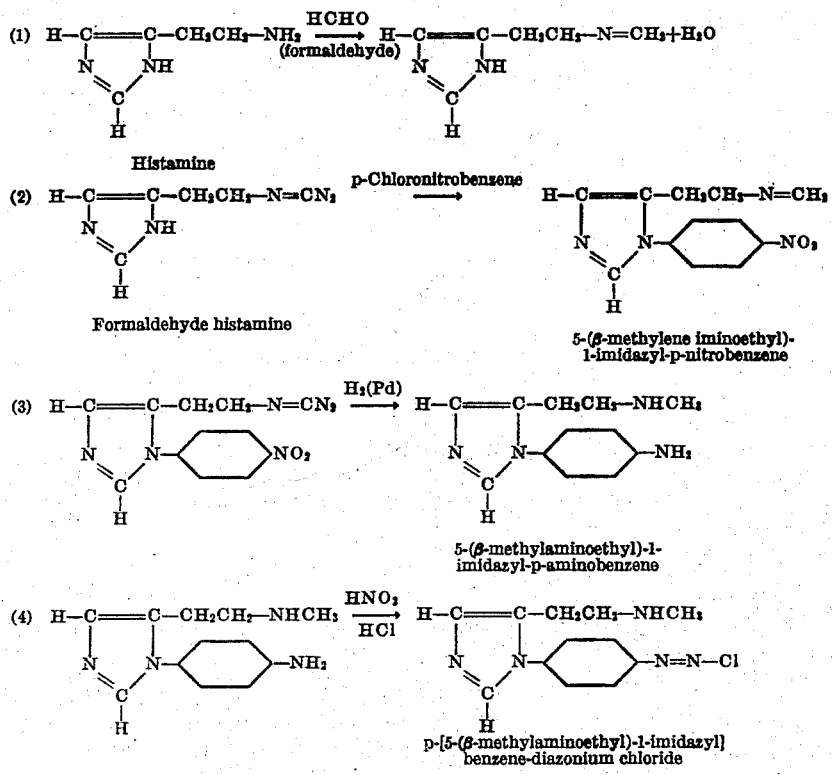

In the first step, the histamine can be dissolved in dilute acetic acid and formalin added, after which the mixture is made alkaline with sodium hydroxide solution and heated. The solvent is removed from the reaction mixture by evaporation and the dry residue extracted with ether. The ether is evaporated from the extract, leaving behind the formaldehyde histamine.

The second step is carried out by heating a mixture of the formaldehyde histamine and p-chloronitrobenzene, if necessary in the presence of a solvent.

The 5-(β-methylene iminoethyl)-1-imidazyl-p-nitrobenzene is separated in the usual manner from any solvent used and then taken up in alcohol and treated with hydrogen under pressure in the presence of a palladium catalyst for reduction of the nitro and the methyleneimino groups. The resulting 5-(β-methylaminoethyl)-1-imidazyl-p-aminobenzene is filtered from the catalyst, the alcohol is evaporated off and the solid product taken up in a solution of strong hydrochloric acid, cooled, and a solution of sodium nitrite added slowly while cooling until the diazotization is complete.

*Example 10.—Preparation of p-[β-(5-imidazyl) ethylcarbamyl]-benzoyl halide*

The steps of this example are as follows;

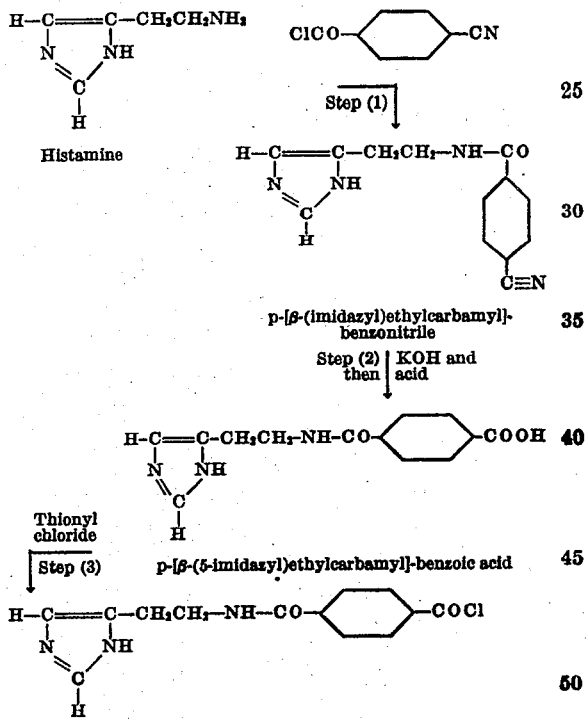

(1) 400 mg. p-cyano benzoyl chloride are dissolved in 15 cc. dry CHCl₃. 368 mg. histamine in CHCl₃ are added. A white precipitate forms immediately. This is taken up in 10 cc. methanol (hot) and filtered with 2 vols. of cold water. A white precipitate comes down. It is washed with ether and dried. The dry product is p-cyano benzoyl histamine or p-[β-(imidazyl) ethylcarbamyl] benzonitrile and melts at 194–195°. Its nitrogen content is 21.74% against a theoretical value of 21.87%.

(2) 90 mg. of p-cyano benzoyl histamine are added to 5 cc. of 10% potassium hydroxide on a steam bath and gradually dissolved. It is neutralized and evaporated to dryness with methanol, dissolved in pyridine and concentrated. The oily residue is dried over calcium chloride to a solid of melting point 60–65° C. It is p-[β-(5-imidazyl) ethylcarbamyl] benzoic acid.

(3) The benzoic acid derivative of step 2 is mixed with an excess of thionyl chloride and allowed to stand for an hour or two, after which the unreacted thionyl chloride is distilled off under reduced pressure. The residue is p-[β-(5-imidazyl) ethylcarbamyl] benzoyl chloride.

*Example 11.—Preparation of carbobenzoxy histidine and derivatives of the same*

The main reactions of this example are indicated by the following,

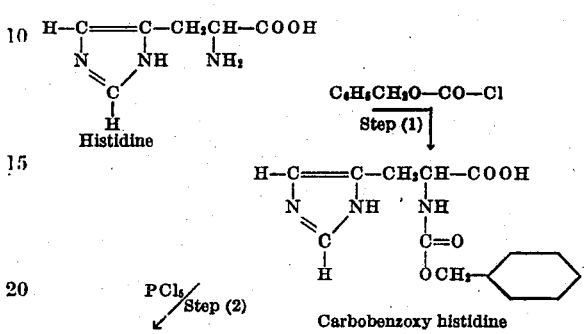

The first step of reaction with carbobenzoxy chloride yields the known compound, carbobenzoxy histidine, of melting point about 209° C. The latter compound is then converted in step 2 to its acid chloride by the usual method for converting a carboxylic acid to its acid chloride by means of phosphorus pentachloride.

*Example 12.—Preparation of 5-(β-carbobenzoxyamidoethyl)-1-chloracetyl imidazole with a protein*

The transformations of this example can be indicated as follows;

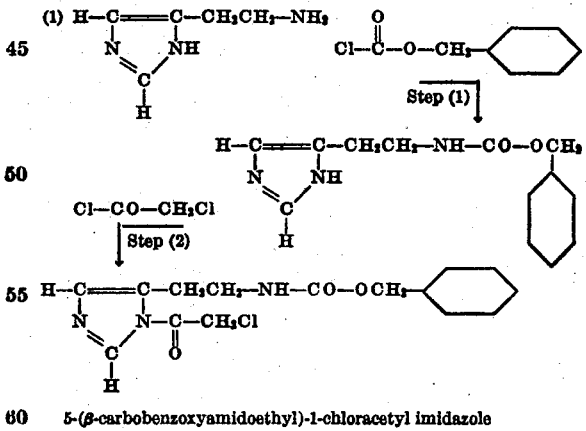

5-(β-carbobenzoxyamidoethyl)-1-chloracetyl imidazole

In the first step the new compound, 5-(β-carbobenzoxyamidoethyl) - imidazole, melting at about 190° C., can be obtained by cooling a solution of histamine in dilute alkaline solution and stirring the carbobenzoxy chloride into the solution. After a few hours the solution is extracted with ether, the ether evaporated off of the extract and the residue cooled to give a white crystalline product. The residue can be recrystallized from suitable solvents if desired.

In step 2 the chloracetyl chloride is reacted with the dry 5-(β-carbobenzoxyamidoethyl)-imidazole, for example in a manner analogous to that shown in step 2 of Example 4.

Example 13.—Preparation of diazotized m-sulfanilyl histamine

The transformations of this example may be illustrated as follows:

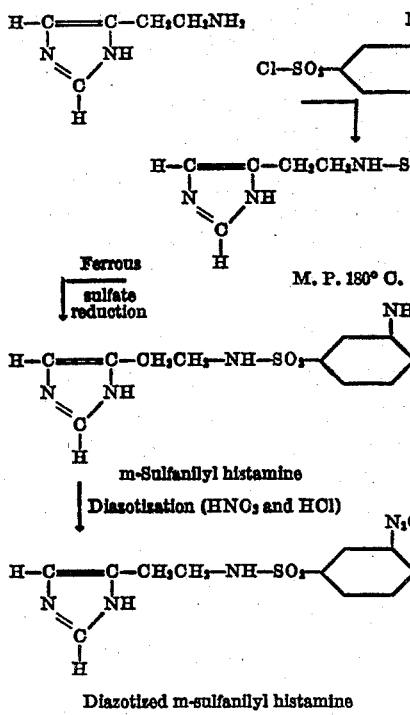

m-Sulfanilyl histamine

Diazotization (HNO₂ and HCl)

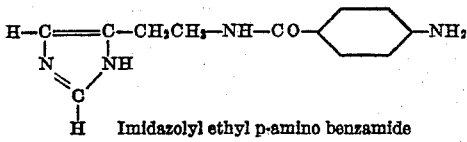

Diazotized m-sulfanilyl histamine 110 grams of m-nitro benzene sulfochloride are dissolved in dry chloroform and 110 grams of histamine added slowly to the solution. The waxy precipitate which forms is filtered off and then dissolved in methyl alcohol. Ether is added to the methyl alcohol solution to reprecipitate the reaction product which is filtered off. It is pure crystalline N-(m-nitrobenzene sulfonyl) histamine and is a new compound of melting point approximately 180° C.

35 grams of the N-(m-nitro benzene sulfonyl) histamine are suspended in about 800 or 900 cc. of water and the suspension added to 2000 cc. of a hot solution of 172 grams of ferrous sulfate, $FeSO_4.7H_2O$. The mixture is boiled 15 minutes and filtered. The filtrate is adjusted to a pH of 7.8 and placed in an ice box whereupon crystals separate out and are then filtered off and dried. The crystals consist of N-(m-amino benzene sulfonyl) histamine or m-sulfanilyl histamine which has a melting point of 265° C. with some charring. The m-sulfanilyl histamine can be diazotized by the usual procedure for diazotizing primary aryl amines which comprises reacting it with an acidic solution of nitrous acid and separating out the diazotized m-sulfanilyl histamine.

Example 14.—Preparation of diazotized 5(1-carbobenzoxy-imidazolyl)-p-aminobenzamide The reactions of this example are represented schematically by the following,

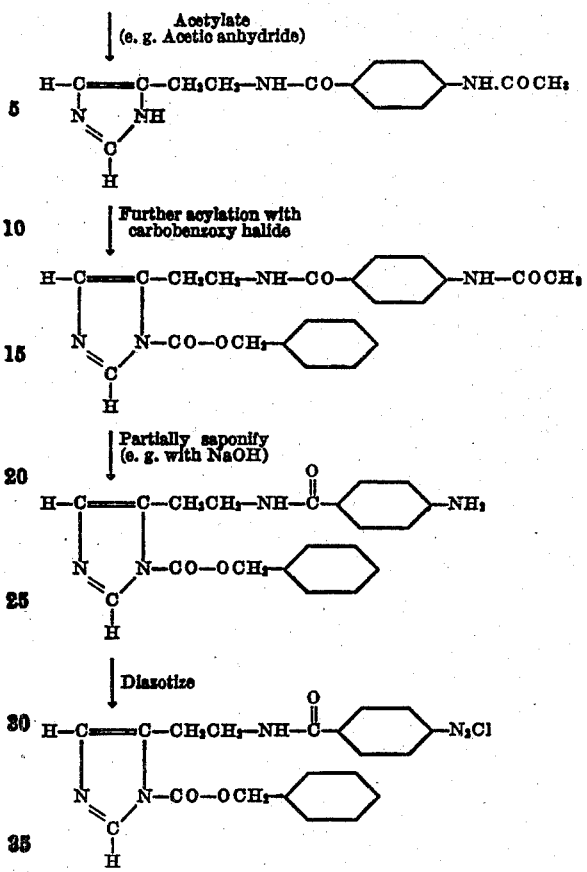

20.0 grams of imidazolyl ethyl p-amino benzamide, obtained for instance as described under Example 2, having a melting point of approximately 191° C., are dissolved in several hundred cc. of acetic anhydride and warmed for an hour. The reaction solution is cooled with ice and the crystals which separate are filtered off and thoroughly dried. They melt at about 92° C. and are substantially pure imidazolyl ethyl p-acetamino benzamide.

The acetamino derivative is dissolved in water containing alkali sufficient to make the solution slightly alkaline. An excess of carbobenzoxy chloride is added to the solution while cooling and stirring the mixture. Sodium bicarbonate can be added at intervals in order to keep the reaction mixture alkaline. The reaction liquid is allowed to stand for 2 hours and is then evaporated and chilled. The white crystals which separate are filtered off and dried. They consist of 5-(1-carbobenzoxy imidazolyl)-p-acetamino benzamide, which is a new compound melting at about 70° C.

By careful partial saponification the acetyl group can be hydrolyzed off of the acetamido compound. The resulting 5-(1-carbobenzoxy imidazolyl)-p-amino-benzamide can be extracted with an organic solvent from the alkaline reaction solution and recovered, for example by evaporation of the solvent or concentrating and cooling. It is then diazotized by means of nitrous acid in the same general way as described for the diazotization for the other amino compounds of the foregoing examples.

The products of the invention as hereinbefore set forth are intermediates which are of particular value for coupling with a protein in order to prepare products useful in preventing allergic symptoms as more fully set forth in my copending application, Serial No. 371,456 of which this is a division.

What I claim as my invention is:

1. A compound of the class consisting of compounds having the following formulae

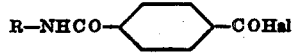

where Hal represents reactive halogen, A represents the anion of a mineral acid, and R is

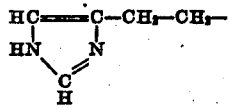

2. A compound having the formula

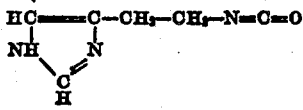

3. A compound having the formula

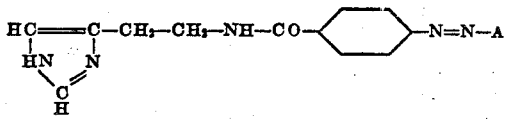

where A represents the anion of a mineral acid.

4. A compound having the formula

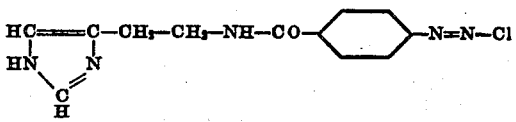

5. A compound having the formula

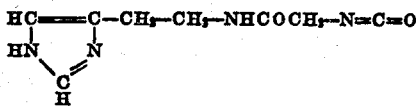

NORBERT H. FELL.